(12) United States Patent
Sizemore

(10) Patent No.: US 7,748,780 B2
(45) Date of Patent: Jul. 6, 2010

(54) JUVENILE SEAT PAD WITH VARIABLE SIZE INFANT RECEPTACLE

(75) Inventor: Jennings Martin Sizemore, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 231 days.

(21) Appl. No.: 11/931,614

(22) Filed: Oct. 31, 2007

(65) Prior Publication Data

US 2008/0277981 A1 Nov. 13, 2008

Related U.S. Application Data

(60) Provisional application No. 60/916,752, filed on May 8, 2007.

(51) Int. Cl.
*A47C 31/00* (2006.01)
(52) U.S. Cl. .................... 297/219.12; 5/655
(58) Field of Classification Search ............ 297/219.12; 5/655, 652, 657
See application file for complete search history.

(56) References Cited

U.S. PATENT DOCUMENTS

| | | | |
|---|---|---|---|
| 4,434,513 A | 3/1984 | Welsh | |
| 4,568,125 A | 2/1986 | Sckolnik | |
| 4,695,092 A | 9/1987 | Hittie | |
| 4,779,930 A | 10/1988 | Rosen | |
| 4,838,611 A | 6/1989 | Talaugon | |
| 4,883,701 A | 11/1989 | Rankin et al. | |
| 4,885,200 A | 12/1989 | Perdelwitz, Jr. et al. | |
| 4,891,454 A | 1/1990 | Perdelwitz, Jr. et al. | |
| 5,137,335 A | 8/1992 | Marten | |
| 5,383,711 A | 1/1995 | Houghteling | |
| 5,586,351 A | 12/1996 | Ive | |
| 5,735,576 A | 4/1998 | Pepys et al. | |
| 5,826,287 A * | 10/1998 | Tandrup | 5/655 X |
| 5,829,829 A | 11/1998 | Celestina-Krevh | |
| 5,842,739 A | 12/1998 | Noble | |
| 5,916,089 A | 6/1999 | Ive | |
| 5,979,981 A | 11/1999 | Dunne et al. | |
| 6,036,263 A | 3/2000 | Gold | |
| 6,139,100 A | 10/2000 | Baskin-Lockman et al. | |
| 6,363,558 B1 | 4/2002 | Dunne | |
| 6,454,352 B1 | 9/2002 | Konovalov et al. | |
| 6,758,526 B2 | 7/2004 | Marbutt | |
| 6,814,405 B2 | 11/2004 | Norman | |
| 6,926,359 B2 | 8/2005 | Runk | |
| 2002/0070592 A1 | 6/2002 | Norman | |
| 2003/0193223 A1 | 10/2003 | Norman | |
| 2004/0017100 A1 | 1/2004 | Gold et al. | |
| 2006/0076812 A1 | 4/2006 | Ward | |

* cited by examiner

*Primary Examiner*—Anthony D Barfield
(74) *Attorney, Agent, or Firm*—Barnes & Thornburg LLP

(57) ABSTRACT

A juvenile seat pad is adapted to be placed on a juvenile seat such as a juvenile vehicle seat. The pad is configured to be altered to produce either a large-sized infant receptacle suitable for full-term and growing infants or a relatively smaller small-sized infant receptacle suitable for premature infants.

24 Claims, 5 Drawing Sheets

JUVENILE SEAT PAD WITH VARIABLE SIZE INFANT RECEPTACLE

This application claims priority under 35 U.S.C. §119(e) to U.S.Provisional Application Ser. No. 60/916,752, filed May 8, 2007, which is expressly incorporated by reference herein.

BACKGROUND

The present disclosure relates to juvenile seats, and particularly to a seat pad for use by an infant on a juvenile vehicle seat. More particularly, the present disclosure relates to infant seat pads for use with juvenile vehicle seats including internal juvenile-restraint harnesses.

Juvenile vehicle seats are used to transport young children in automobiles or other vehicles. Some seats are sized to receive infants and other seats are sized primarily to receive relatively larger toddlers. Juvenile seats are also included in strollers, high chairs, booster seats, carriers, and other juvenile products.

SUMMARY

An apparatus in accordance with the present disclosure includes a juvenile seat and a seat pad for the juvenile seat. The seat pad is adapted to be placed on the juvenile seat by a caregiver.

In illustrative embodiments, the juvenile seat is a juvenile vehicle seat. The juvenile vehicle seat includes a seat shell and an internal child-restraint harness coupled to the seat shell. The seat pad is adapted to set on the seat shell or on a larger cover or pad coupled to the seat shell. The seat pad is configured to provide a cushioned receptacle sized to receive an infant therein so that the infant can be restrained by the child-restraint harness.

In illustrative embodiments, a convertible seat pad in accordance with the present disclosure is adaptable "in the field" by a caregiver to receive and support both "full-term" and "premature" (i.e., undersized) infants in a seat shell of a juvenile vehicle seat or in another suitable juvenile seat. The convertible seat pad is made illustratively of cloth and soft materials and includes various cushions that can be moved relative to a mat providing a backrest at the option of the caregiver to form either a small-sized infant receptacle suitable for a premature infant or a relatively larger large-sized infant receptacle suitable for a relatively larger full-term and/or growing infant.

In illustrative embodiments, the convertible seat pad includes four foldable side wing cushions and a long rim cushion having left and right cushion arms that are free to be moved by a caregiver relative to the foldable side wing cushions and to the backrest. By moving the side wing cushions and the rim cushion relative to the backrest, a caregiver can "reconfigure" the convertible seat pad in the field to provide either a small-sized or large-sized infant receptacle. The seat pad is formed to include belt-receiving notches to allow an infant to be restrained by the child-restraint harness whether the infant is place in the small-sized or the large-sized infant receptacle.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompany figures in which.

DETAILED DESCRIPTION

Figures 1, 2, 3:
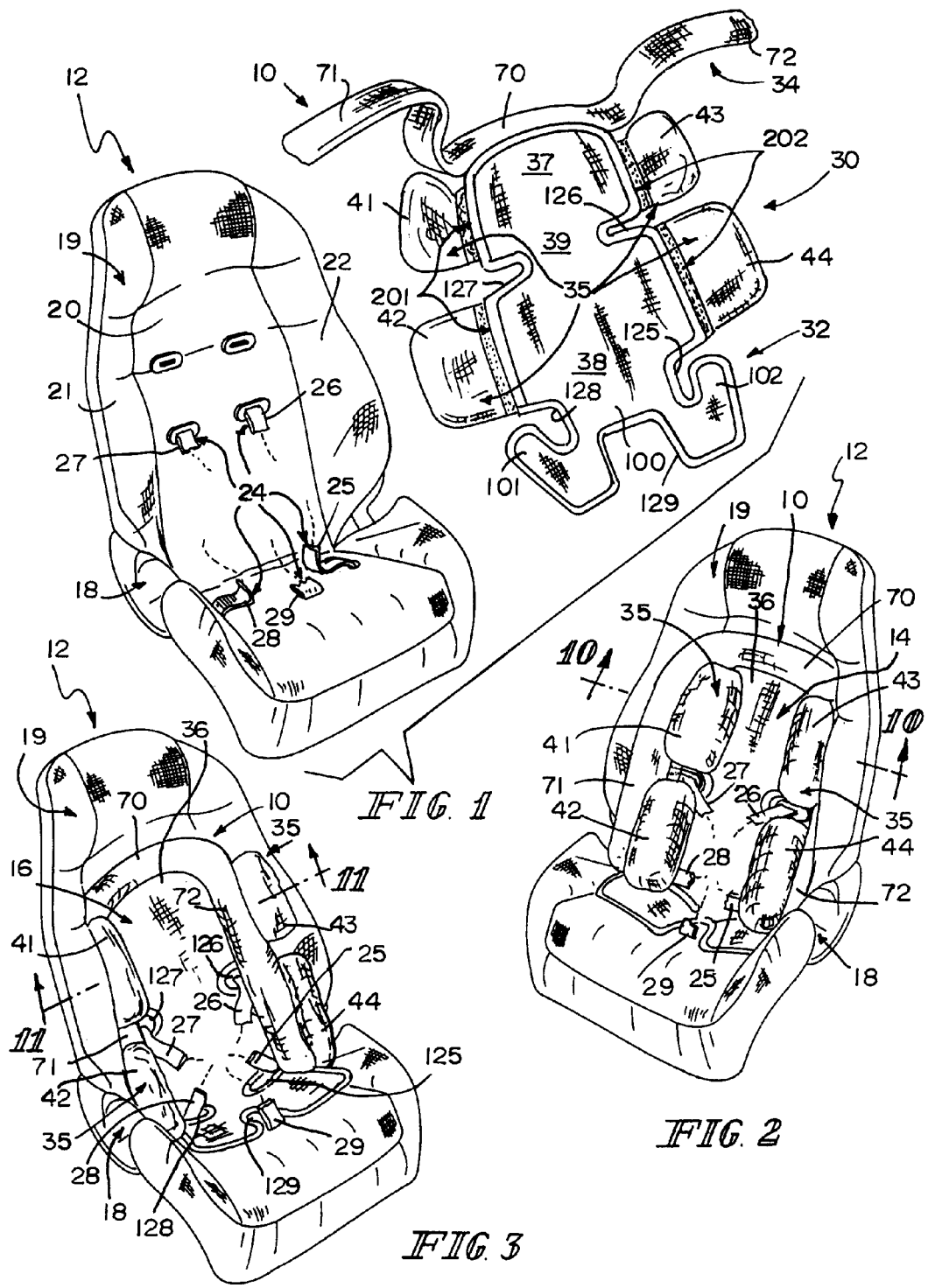
FIG. 1 is a perspective view showing a convertible seat pad that can be installed by a caregiver on a juvenile vehicle seat to support premature infants as suggested in FIG. 2 or to support full-term infants as suggested in FIG. 3.
FIG. 2 is a perspective view of the juvenile seat and convertible seat pad of FIG. 1 after a caregiver has folded the seat pad in a manner suggested, for example, in FIGS. 6 and 7 to provide a "small-sized" infant receptacle suitable for receiving undersized infants.
FIG. 3 is a perspective view of the juvenile seat and convertible seat pad of FIG. 1 after a caregiver has folded the seat pad in a manner suggested, for example, in FIGS. 8 and 9 to provide a relatively larger "large-sized" infant receptacle suitable for receiving relatively larger full-term infants.

A convertible seat pad 10 can be used in a juvenile vehicle seat 12 as suggested in FIG. 1 to provide support for an infant (not shown) seated in juvenile vehicle seat 12. Seat pad 10 can be folded in one way by a caregiver and installed in juvenile vehicle seat 12 to provide a small-sized infant receptacle 14 suitable for receiving "premature" (i.e., undersized) infants therein as suggested, for example, in FIGS. 2, 7, and 10. Seat pad 10 can be folded in another way by a caregiver and installed in juvenile vehicle seat 12 to provide a relatively larger large-sized infant receptacle 16 suitable for receiving relatively larger "full-term" and growing infants as suggested, for example, in FIGS. 3, 9, and 11. Seat pad 10 can also be used on another suitable juvenile seat (not shown) such as a stroller, high chair, booster seat, or carrier.

In an illustrative embodiment, juvenile vehicle seat 12 includes a shell 18 made of plastics or other sturdy material and an optional cover 19 coupled to shell 18. Illustratively, cover 19 includes a rear cushion 20, a first side cushion 21 coupled to one side of rear cushion 20, and a second side cushion 22 coupled to an opposite side of rear cushion 20 as shown best in FIGS. 10 and 11. Either one of shell 18 or cover 19 provides a suitable pad-receiving surface on which to place convertible seat pad 10. A five-point harness 24 (or other suitable child restraint system) comprising belts 25, 26, 27, 28, and 29 is coupled to shell 18 and adapted to restrain a child seated on shell 18 or cover 19 and an infant seated on seat pad 10.

As suggested, for example, in FIGS. 1 and 3, convertible seat pad 10 includes a seat back 30, a seat bottom 32, and a rim cushion 34. Seat bottom 32 is coupled to a lower portion of seat back 30 and rim cushion 34 is coupled to an upper portion of seat back 30 in the illustrated embodiment. Seat back 30 and seat bottom 32 cooperate to form, for example, five harness belt-receiving notches 125, 126, 127, 128, and 129 as shown, for example, in FIGS. 4 and 5.

Figure 4:
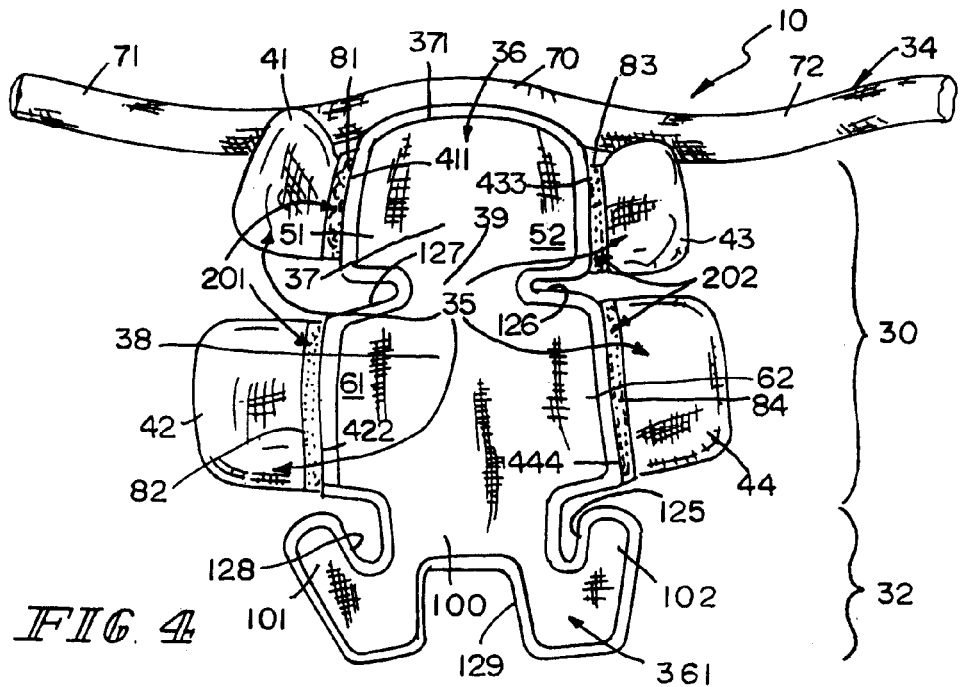
FIG. 4 is a plan view of a "front" face of a unfolded convertible seat pad of the type shown in FIG. 1 showing that the convertible seat pad includes a seat back having an "I-shaped" backrest and four foldable side wing cushions mounted for pivotable movement relative to the backrest, a foldable seat bottom coupled to a lower portion of the backrest, and an elongated rim cushion including outwardly extending movable left and right cushion arms and a top cushion mount arranged to interconnect the left and right cushion arms and to tether those arms to an upper portion of the backrest and also showing four separate inner rim anchors wherein each inner rim anchor is defined by a hook-and-loop fastener strip located on the front face of the seat pad along a fold line provided between the backrest and one of the foldable side wing cushions.
Figure 10:
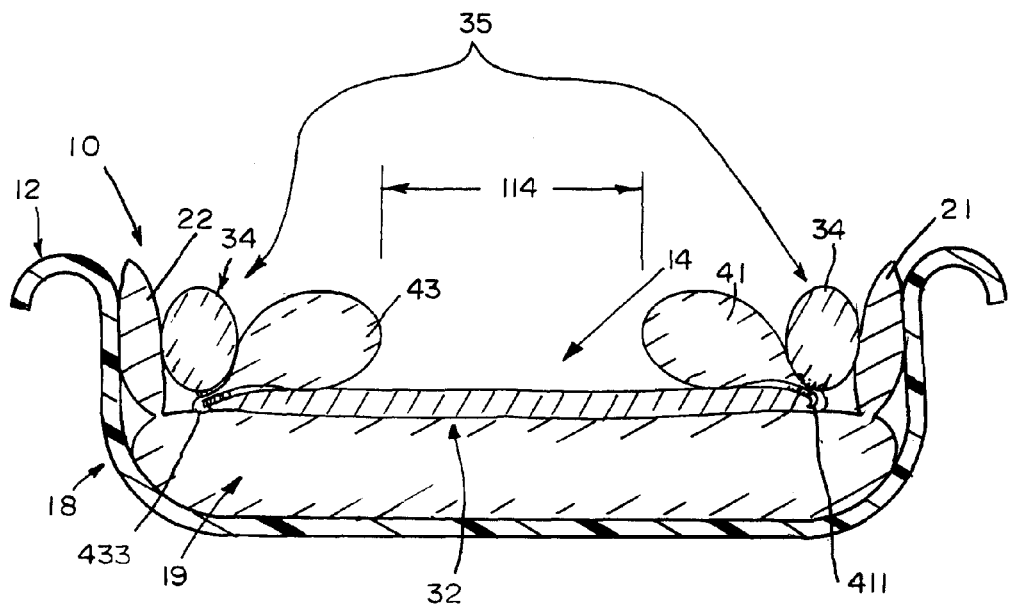
FIG. 10 is a sectional view taken along line 10-10 of FIG. 2 showing a relatively small lateral width of the small-sized infant receptacle formed between the "inwardly" folded side wing cushions of the convertible seat pad.
Figure 11:
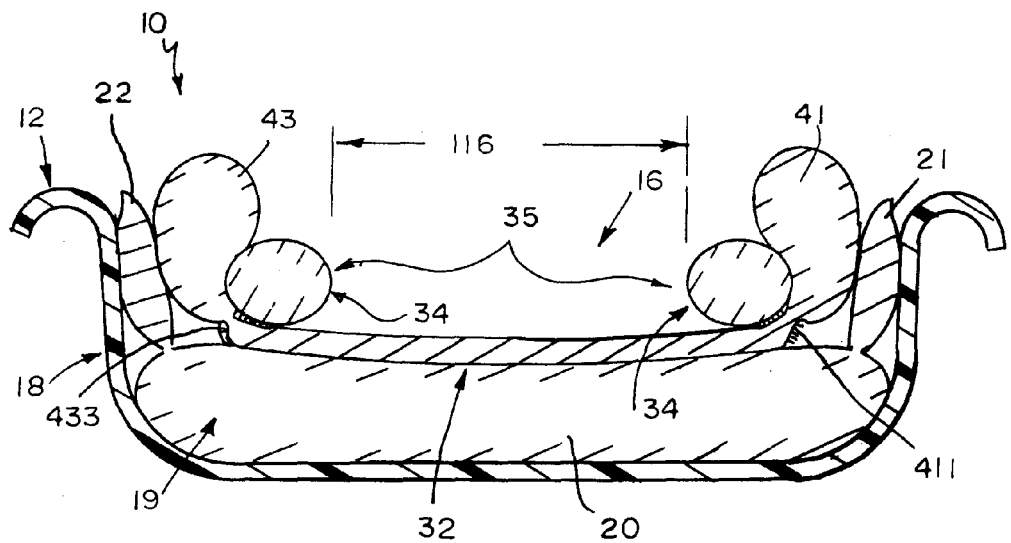
FIG. 11 is a sectional view taken along line 11-11 of FIG. 3 showing a relatively larger lateral width of the large-sized infant receptacle formed between the "outwardly" folded side wing cushions of the convertible seat pad.

As shown best in FIG. 4, seat back 30 illustratively includes a backrest 36 and a small-infant support 35 coupled to backrest 36. Small-infant support 35 is mounted for movement relative to backrest 36 and rim cushion 34 as suggested, for example, in FIGS. 6 and 8, between an "infant-support" position inside a space bounded, in part, by rim cushion 34 as shown in FIGS. 2, 7, and 10 and a "stored" position outside a space bounded, in part, by rim cushion 34 as shown in FIGS. 3, 9, and 11. In the infant-support position shown in FIGS. 2, 7, and 10, rim cushion 34 and small-infant support 35 cooperate with backrest 36 to define a small-sized infant receptacle 14 suitable for supporting many premature infants. In the stored position shown in FIGS. 3, 9, and 11, rim cushion 34 cooperates with backrest 36 to define a relatively large large-sized infant receptacle 16.

In illustrative embodiments, the movable small-infant support 35 comprises four "foldable" side wing cushions 41, 42, 43, and 44 coupled to backrest 36 for pivotable movement relative to backrest 36. As suggested in FIGS. 1 and 8, first and second side wing cushions 41, 42 are coupled to a left-side portion 201 of backrest 36. Third and fourth side wing cushions 43, 44 are coupled to a right-side portion 202 of backrest 36.

Side wing cushions 41 and 43 are smaller in size and located near the top of backrest 36 in the illustrative embodiment shown in FIG. 1. Side wing cushions 42 and 44 are relatively larger in size and located near the bottom of backrest 36. It is within the scope of this disclosure to provide one or more side wing cushions and couple them only to the left side or to the right side of backrest 36. It is also within the scope of this disclosure to provide one side wing on the left side of backrest 36 and one side wing cushion on the right side of backrest 36.

In an illustrative embodiment, backrest 36 is "I-shaped." Backrest 36 is formed to include an upper center head mat 37 coupled to rim cushion 34, a lower center body mat 38 coupled to seat bottom 32, and a neck 39 arranged to interconnect head and body mats 37, 38. Backrest 36 is formed to include belt-receiving notches 126, 127 and neck 39 is arranged to lie between those notches 126, 127 as shown, for example, in FIG. 4. Left-side portion 201 of backrest 36 is established along a left side of upper center head mat 37 and lower center body mat 38 as suggested in FIG. 1. Right-side portion 202 of backrest 36 is established along a right side of head and body mats 37, 38 as also suggested in FIG. 1.

The four side wing cushions 41, 42, 43, and 44 included in movable small-infant support 35 can be folded relative to backrest 36 easily by a caregiver to convert seat pad 10 from the "premature-infant" configuration of FIG. 2 to the "large-infant" configuration of FIG. 3. Rim cushion 34 can then be folded by the caregiver to mate temporarily with left-side and right-side portions 201, 202 of backrest 36 to retain side wing cushions 41, 42, 43, and 44 in selected positions "anchored" to backrest 36.

Figure 5:
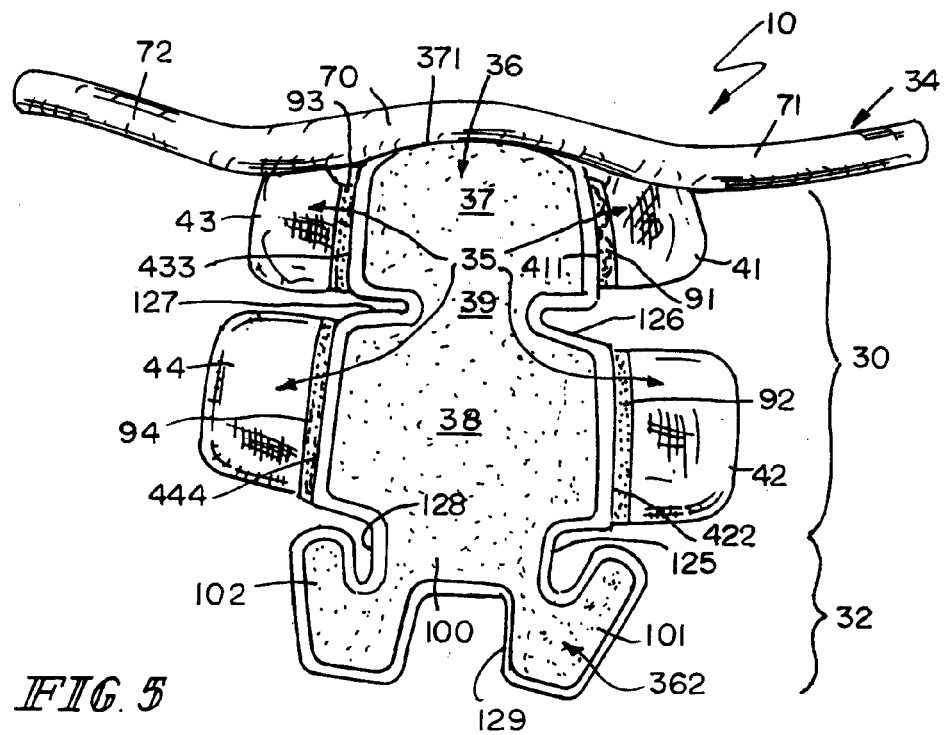
FIG. 5 is a plan view of a "rear" face of the unfolded convertible seat pad of FIG. 4 showing four separate outer rim anchors wherein each outer rim anchor is defined by a hook-and-loop fastener strip located on the rear face of the seat pad along a fold line provided between the backrest and one of the foldable side wing cushions.

An upper left side wing cushion 41 is coupled to a first upper lobe 51 of head mat 37 as suggested in FIG. 5 for pivotable movement about a first fold line 411 as suggested in FIGS. 6, 8, 10, and 11. A lower left side wing cushion 42 is coupled to a first lower lobe 61 of body mat 38 as suggested in FIG. 4 for pivotable movement about a second fold line 422 as suggested in FIGS. 6 and 8. First upper lobe 51 and first lower lobe 61 cooperate to form belt-receiving notch 127 therebetween as shown in FIG. 4.

An upper right side wing cushion 43 is coupled to a second upper lobe 52 of head mat 37 as suggested in FIG. 4 for pivotable movement about a third fold line 433 as suggested in FIGS. 6, 8, 10, and 11. A lower right side wing cushion 44 is coupled to a second lower lobe 62 of body mat 38 as suggested in FIG. 4 for pivotable movement about a fourth fold line 444 as suggested in FIGS. 6 and 8. Second upper lobe 52 and second lower lobe 62 cooperate to form belt-receiving notch 126 therebetween as shown in FIG. 4.

Convertible seat pad 10 is foldable by a caregiver along fold lines 411, 422, 433, and 444 (shown best in FIG. 4) to move the four side wing cushions 41, 42, 43, and 44 relative to backrest 36 from an "initial" position shown in FIGS. 1, 4, and 5 to either (1) a first or "infant-support" position shown, for example, in FIGS. 2, 7, and 10 or (2) a second or "stored" position shown, for example, in FIGS. 3, 9, and 11. As suggested in FIG. 6, side wing cushions 41, 42, 43, and 44 are moved in "forward" directions 241, 242, 243, and 244, respectively, relative to backrest 36 to assume the first (infant-support) positions that will lie inside a space bounded, in part, by U-shaped rim cushion 34 to form small-sized infant receptacle 14 as shown, for example, in FIG. 7. As suggested in FIG. 8, side wing cushions 41, 42, 43, and 44 are moved in "rearward" directions 341, 342, 343, and 344, respectively, relative to backrest 36 to assume the second (stored) positions that will lie outside a space bounded, in part, by U-shaped rim cushion 34 to form the relatively larger large-sized infant receptacle 16 as shown, for example, in FIG. 9.

As suggested in FIG. 4, rim cushion 34 is coupled to backrest 36 and configured to include a left cushion arm 71 mounted for movement relative to backrest 36 between a "separated" position (shown in solid in FIG. 4 and in phantom in FIGS. 6 and 8) separated from left-side portion 201 of backrest 36 and "mated" positions (shown in FIGS. 7 and 9) mated with left-side portion 201 of backrest 36. Rim cushion 34 also includes a right cushion arm 72 mounted for movement relative to backrest 36 between a separated position (shown in solid in FIG. 4 and in phantom in FIGS. 6 and 8) separated from right-side portion 202 of backrest 36 and mated positions (shown in FIGS. 7 and 9) mated with right-side portion 202 of backrest 36.

Figure 6:
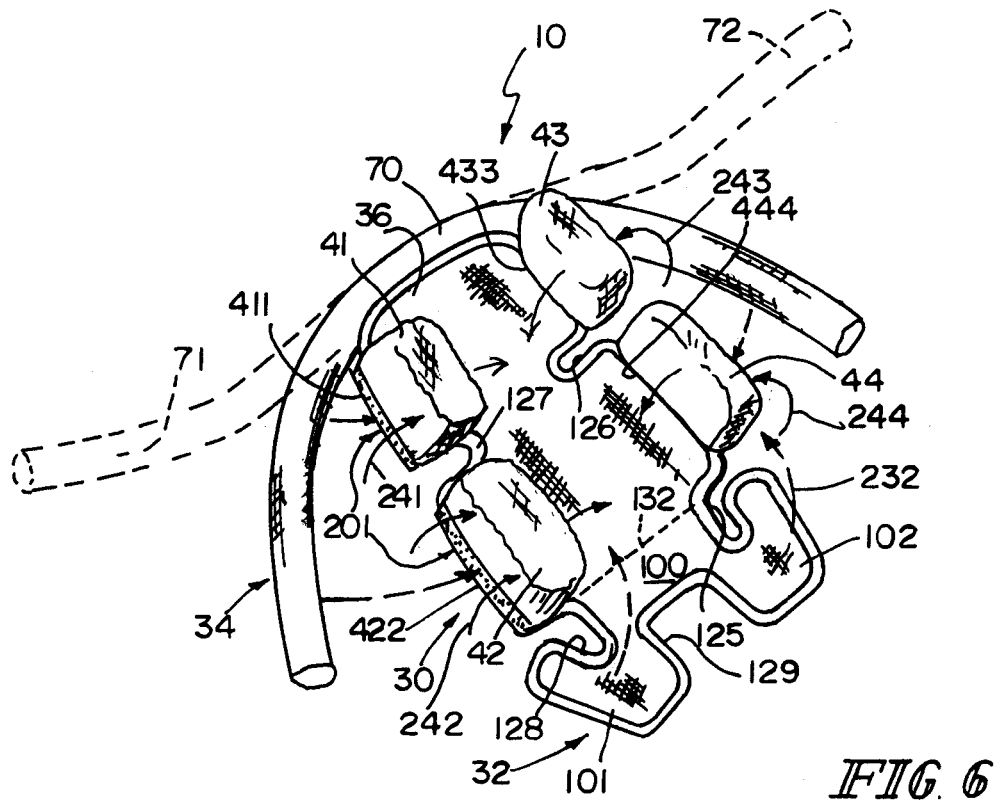
FIGS. 6 and 7 show how the convertible seat pad can be manipulated by a caregiver in a first manner to assume a first configuration shown, for example, in FIG. 2 to provide a small-sized infant receptacle wherein the four side wing cushions lie inside a space defined by the "U-shaped" rim cushion.
Figure 7:
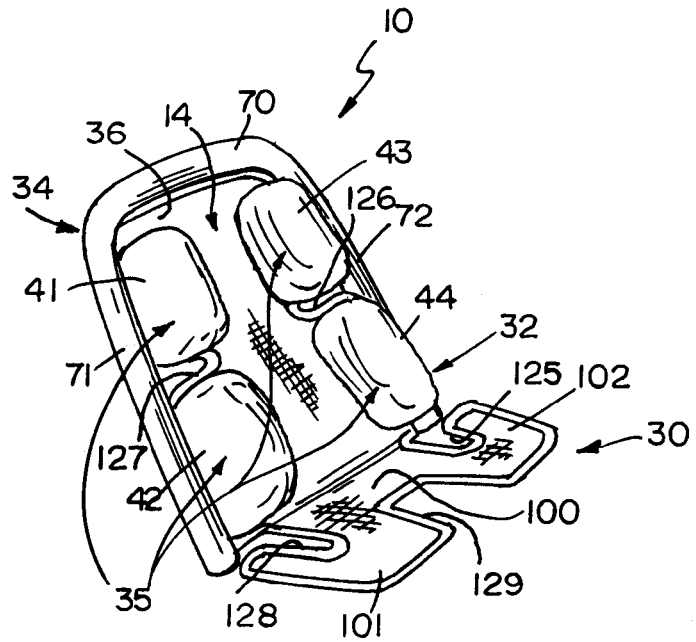

As suggested in FIGS. 6 and 7, left and right cushion arms 71, 72 are movable relative to backrest 36 from the separated positions to assume "first" mated positions located on a front face 361 (see FIG. 4) of seat back 30 defining a space therebetween receiving side wing cushions 41, 42, 43, and 44 therein. As suggested in FIGS. 8 and 9, left and right cushion arms 71, 72 are also movable relative to backrest 36 from the separated positions to assume "second" mated positions on a rear face 362 (see FIG. 5) of seat back 30 located outside of the space defined between left and right cushion arms 71, 72.

In an illustrative embodiment, shown, for example, in FIG. 4, rim cushion 34 also includes a top cushion mount 70 coupled to backrest 36. Left cushion arm 71 is coupled (e.g., tethered) to top cushion mount 70. Right cushion arm 72 is coupled (e.g., tethered) to top cushion mount 70. Top cushion mount 70 is located between and arranged to interconnect left and right cushion arms 71, 72. In the illustrated embodiment, top cushion mount 70 is coupled to a top edge 371 of upper center head mat 37 of backrest 36.

As suggested in FIGS. 4 and 5, seat pad 10 includes anchor means on seat back 30 for retaining rim cushion 34 in a predetermined position temporarily on backrest 36 at the option of a caregiver to allow the caregiver in the field to form either (1) the small-sized infant receptacle 14 suggested in FIGS. 2, 7, and 10 or (2) the large-sized infant receptacle 16 suggested in FIGS. 3, 9, and 11. In the illustrated embodiment, seat pad 10 includes first, second, third, and fourth inner rim anchors 81, 82, 83, and 84 coupled to front face 361 of seat back 30 as shown, for example, in FIG. 4. Illustratively, seat pad 10 also includes first, second, third, and fourth outer rim anchors 91, 92, 93, and 94 coupled to rear face 362 of seat back 30 as shown, for example, in FIG. 5.

Each inner rim anchor 81, 82, 83, and 84 is configured to mate with and retain a portion of rim cushion 34 in a temporary fixed (first mated) position on backrest 36 and/or a portion of side wing cushions 41, 42, 43, and 44. In illustrative embodiments, each of inner rim anchors 81, 82, 83, and 84 is a hook-and-loop fastener configured to couple to a portion of rim cushion 34 itself or a companion hook-and-loop fastener coupled to rim cushion 34. It is within the scope of this disclosure to use buttons or sewn zippers or other suitable fasteners as the rim anchors. It is also feasible to use "gripper tape" (snap embedded into a twill tape) by providing male and female gripper tape sewn in place on rim cushion 34 and seat back 30.

In the illustrated embodiment suggested in FIG. 4, first inner rim anchor 81 is a hook-and-loop fastener strip coupled to seat back 30 and arranged to extend along fold line 411 and second inner rim anchor 82 is a hook-and-loop fastener strip coupled to seat back 30 and arranged to extend along fold line 422. Third inner rim anchor 83 is a hook-and-loop fastener strip coupled to seat back 30 and arranged to extend along fold line 433 and fourth inner rim anchor 84 is a hook-and-loop fastener strip coupled to seat back 30 and arranged to extend along fold line 444.

Each outer rim anchor 91, 92, 93, and 94 is configured to mate with and retain a portion of rim cushion 34 in a temporary fixed (second mated) position on backrest 36 and/or a portion of side wing cushions 41, 42, 43, and 44. In illustrative embodiments, each of outer rim anchors 91, 92, 93, and 94 is a hook-and-loop fastener configured to couple to a portion of rim cushion 34 itself or a companion hook-and-loop fastener coupled to rim cushion 34. In the illustrated embodiment suggested in FIG. 5, first outer rim anchor 91 is a hook-and-loop fastener strip coupled to seat back 30 and arranged to extend along first fold line 411, second outer rim anchor 92 is a hook-and-loop fastener strip coupled to seat back 30 and arranged to extend along second fold line 422, third outer rim anchor 93 is a hook-and-loop fastener strip coupled to seat back 30 and arranged to extend along third fold line 433, and fourth outer rim anchor 94 is a hook-and-loop fastener strip coupled to seat back 30 and arranged to extend along fourth fold line 444.

Seat bottom 32 of convertible seat pad 10 includes, for example, a left flap 101, a right flap 102, and a center flap bridge 100 arranged to interconnect left and right flaps 101, 102 as suggested in FIGS. 1 and 4. In an illustrative embodiment, center flap bridge 100 is coupled to lower center body mat 38 of backrest 36. As shown in FIG. 4, first lower lobe 61, left flap 101, and center flap bridge 100 cooperate to form harness-receiving notch 128. Second lower lobe 62, right flap 102, and center flap bridge 100 cooperate to form harness-receiving notch 125. Flaps 100, 101, and 102 cooperate to form harness-receiving notch 129. Seat bottom 32 can be folded in direction 232 about fold line 132 as suggested in FIGS. 6 and 8 to cause seat bottom 32 to lie at an obtuse angle to seat back 36 as shown, for example, in FIGS. 7 and 9.

In use, a caregiver can change the shape of convertible seat pad 10 "in the field" to "convert" seat pad 10 for use on a juvenile vehicle seat 12 by a premature infant as shown in FIGS. 2 and 10 and by a relatively larger infant as shown in FIGS. 3 and 11. Left and right cushion arms 71, 72 are moved by the caregiver to mate with inner rim anchors 81, 82, 83, and 84 as suggested in FIGS. 6 and 7 after side wing cushions 41, 42, 43, and 44 are folded forwardly relative to backrest 36 to locate side wing cushions 41, 42, 43, and 44 in a space bounded by U-shaped rim cushion 34 as suggested in FIG. 7 to produce a small-sized infant receptacle 14 having a width dimension 114 (see FIG. 10) between a first cushion column established by side wing cushions 41, 42 and a second cushion column established by side wing cushions 43, 44. Alternatively, left and right cushion arms 71, 72 are moved by the caregiver to mate with outer rim anchors 91, 92 93, and 94 as suggested in FIGS. 8 and 9 after side wing cushions are folded rearwardly relative to backrest 36 to locate side wing cushions 41, 42, 43, and 44 outside a space bounded, in part, by U-shaped rim cushion 34 as suggested in FIG. 9 to produce a large-sized infant receptacle 16 (see FIG. 11) between a first cushion column established by side wing cushions 41, 42 and a second cushion column established by side wing cushions 43, 44.

A juvenile seat pad 10 includes a seat back 30, a seat bottom 32, and a rim cushion 34 as suggested in FIG. 1-9. Seat back 30 includes a backrest 36 and a first side wing cushion 41 coupled to backrest 30 along a first fold line 41 as shown, for example, in FIG. 4. Seat bottom 32 is coupled to a lower portion of seat back 30. Rim cushion 34 is coupled to an upper portion of seat back 30.

Figure 8:
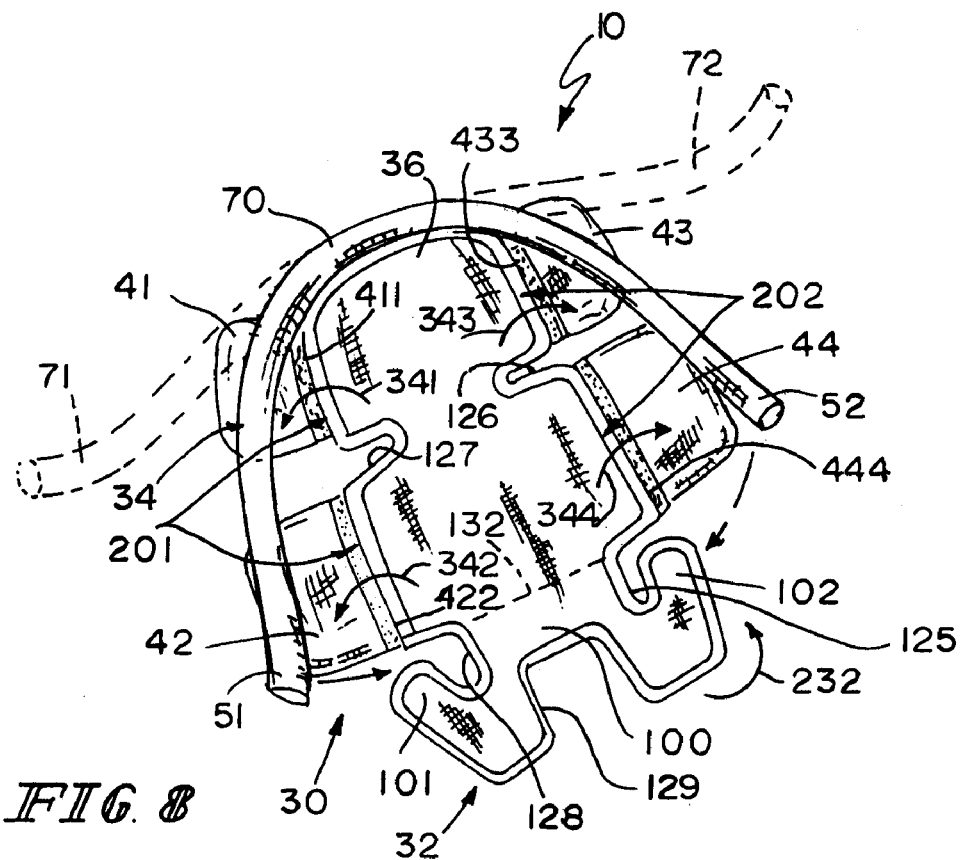
FIGS. 8 and 9 show how the convertible seat pad can be manipulated by a caregiver in a second manner to assume a second configuration shown, for example, in FIG. 3 to provide a large-sized infant receptacle wherein the four side wing cushions lie outside a space defined by the U-shaped rim cushion.
Figure 9:
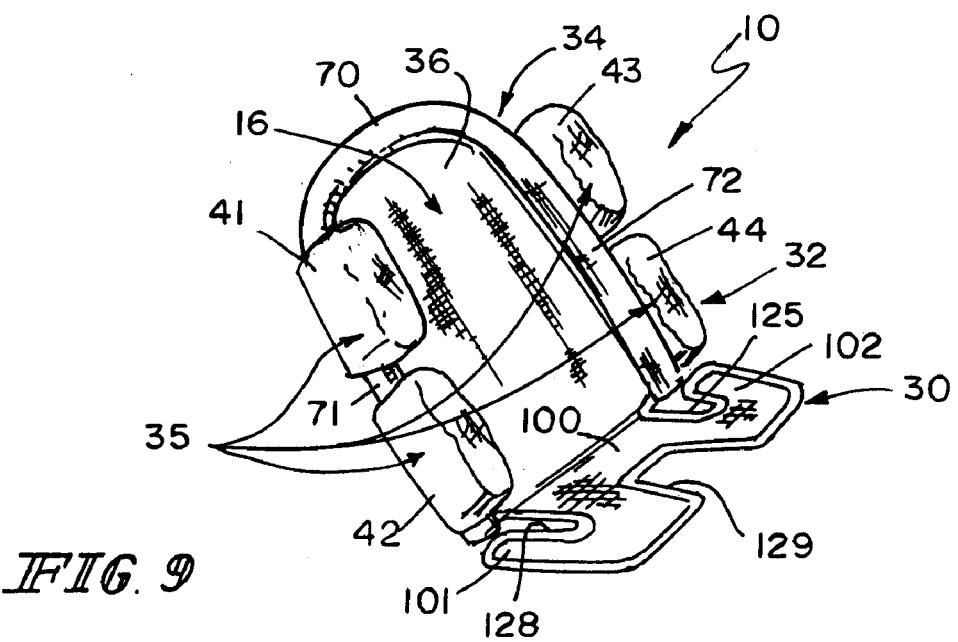

Rim cushion 34 includes a first cushion arm 71 mounted for movement among an initial position separated from seat back 30 as shown in solid in FIG. 4 and in phantom in FIGS. 6 and 8, a first mated position mated temporarily with a front face 361 of seat back 30 as shown in FIGS. 3 and 9, and a second mated position mated temporarily with an opposite rear face 362 of seat back 30 as shown in FIGS. 2 and 7. First side wing cushion 41 is movable relative to backrest 36 between an "infant-support" position arranged to overlie backrest 36 as shown in FIGS. 2, 7, and 11 and a "stored" position arranged to lie away from backrest 36 as shown in FIGS. 3, 9, and 10.

Juvenile seat pad 10 also includes anchor means for retaining first cushion arm 41 temporarily on seat back 30 at the option of a caregiver in a selected one of the first mated position to retain first side wing cushion 41 in the infant-support position as suggested in FIGS. 6 and 7 and the second mated position to retain first side wing cushion 41 in the stored position as suggested in FIGS. 8 and 9. The anchor means includes a first inner rim anchor 81 coupled to front face 36 of seat back 30 and configured to be coupled to a first portion of first cushion arm 71 as suggested in FIG. 4 and a first outer rim anchor 91 coupled to rear face 362 of seat back 30 and configured to be coupled to a second portion of first cushion arm 71 as suggested in FIG. 5.

First side wing cushion 41 is coupled to backrest 36 along a first fold line 411 and each of first inner and outer rim anchors 81, 91 are arranged to extend along first fold line 411 as suggested in FIGS. 4 and 5. Each of first inner and outer rim anchors 81, 91 is a hook-and-loop fastener in an illustrative embodiment. First inner rim anchor 81 is coupled to first cushion arm 41 to move therewith relative to backrest 36. First outer rim anchor 91 is coupled to first cushion arm 41 to move therewith relative to backrest 36.

Rim cushion 34 is an elongated cylinder-shaped member comprising first cushion arm 71 and a top cushion mount 70 as suggested in FIGS. 1 and 4-9. Top cushion mount 70 is coupled to backrest 36 and to first cushion arm 71 to support first cushion arm 71 for movement relative to seat back 36 among the initial position and the first and second mated positions as suggested in FIGS. 4-9.

Rim cushion 34 further comprises a second cushion arm 72 coupled to top cushion mount 70 to cause top cushion mount 70 to interconnect first and second cushion arms 71, 72 as suggested in FIGS. 1, 4, and 5. Second cushion arm 72 is mounted for movement among an initial position separated from seat back 36 as shown in solid in FIG. 4 and in phantom in FIGS. 6 and 8, a first mated position mated temporarily with front face 361 of seat back 30 as shown in FIGS. 3 and 9, and a second mated position mated temporarily with opposite rear face 362 of seat back 30 as suggested in FIGS. 2 and 7. First and second cushion arms 71, 72 cooperate to define a large-sized infant receptacle 16 therebetween upon movement of each of first and second cushion arms 71, 72 to assume respective first mated positions and movement of first side wing cushion 41 to the stored position as shown, for example, in FIGS. 3 and 9.

First side wing cushion 41 is coupled to the backrest along a first fold line 411 as shown, for example, in FIG. 4. Seat back 30 further includes a second side wing cushion 42 coupled to backrest 36 along a second fold line 422 for movement relative to backrest 36 between an "infant-support" position arranged to overlie backrest 36 as shown in FIG. 7 and a stored position arranged to lie away from backrest 36 as shown in FIG. 9. First and second side wing cushions 41, 42 are arranged to lie in large-sized infant receptacle 16 and cooperate to define a relatively smaller small-sized infant receptacle 14 therebetween upon movement of first and second cushion arms 71, 72 to assume the respective second mated positions and movement of first and second side wing cushions 71, 72 to assume respective infant-support positions as shown in FIGS. 2 and 7.

First and second cushion arms 71, 72 cooperate to define large-sized infant receptacle 16 therebetween in response to movement of first and second cushion arms 71, 72 to the first mated positions and movement of first and second side wing cushions 71, 72 to the stored positions as suggested in FIGS. 8 and 9. First and second side wing cushions 71, 72 cooperate to define a relatively smaller small-sized infant receptacle 14 therebetween in response to movement of first and second cushion arms 71, 72 to the second mated positions and movement of first and second side wing cushions 71, 72 to the infant-support positions as suggested in FIGS. 6 and 7.

Backrest 36 includes an upper center head mat 37 coupled to rim cushion 34, a lower center body mat 38 coupled to seat bottom 32, and a neck 39 arranged to interconnect head and body mats 37, 38. First side wing cushion 41 is coupled to upper center head mat 37 along first fold line 411. Second side wing cushion 42 is coupled to upper center head mat 37 along second fold line 442.

Rim cushion 34 further includes a top cushion mount 70 arranged to interconnect first and second cushion arms 71, 72 and coupled to a portion of upper center head mat 37 located between first and second fold lines 411, 422 as shown, for example, in FIG. 4. First anchor means is provided on first side wing cushion 41 for retaining first cushion arm 71 temporarily in a stationary position relative to upper center head mat 37 at the option of a caregiver in a selected one of the first mated position to retain first side wing cushion 41 in the infant-support position as shown in FIGS. 6 and 7 and the second mated position to retain first side wing cushion 41 in the stored position as shown in FIGS. 8 and 9. Second anchor means is provided on second side wing cushion 42 for retaining second cushion arm 72 temporarily in a stationary position relative to upper center head mat 37 at the option of a caregiver in a selected one of the first mated position to retain second side wing cushion 42 in the infant-support position as shown in FIGS. 6 and 7 and the second mated position to retain second side wing cushion 42 in the stored position as shown in FIGS. 8 and 9.

First anchor means is provided on side wing cushion 42 for retaining first cushion arm 71 temporarily in a stationary position relative to lower center body mat 38 at the option of a caregiver in a selected one of the first mated position to retain side wing cushion 42 in the infant-support position and the second mated position to retain side wing cushion 42 in the stored position. Second anchor means is provided on the side wing cushion 44 for retaining second cushion arm 72 temporarily in a stationary position relative to lower center body mat 38 at the option of a caregiver in a selected one of the first mated position to retain the side wing cushion 44 in the infant-support position and the second mated position to retain side wing cushion 44 in the stored position.

Juvenile seat pad 12 includes a backrest 36 having a left-side portion 201 and a right-side portion 202 and a small-infant support 35 mounted for movement relative to backrest 36 between a stored position lying away from backrest 36 as suggested in FIGS. 8, 9, and 11 and an infant-support position contacting backrest 36 as suggested in FIGS. 6, 7, and 10. Juvenile seat pad 12 also includes a rim cushion 34 coupled to backrest 36. Rim cushion 34 includes a left cushion arm 71 mounted for movement relative to backrest 36 between a first position alongside left-side portion 201 of backrest 36 and a second position away from left-side portion 201 of backrest 36. Rim cushion 34 also includes a right cushion arm 72 mounted for movement relative to backrest 36 between a first position alongside right-side portion 202 of backrest 36 and a second position away from right-side position 202 of backrest 36.

Left and right cushion arms 71, 72 cooperate to define a large-sized infant receptacle 16 located therebetween in response to movement of left and right cushion arms 71, 72 to the first positions while small-infant support 35 is located in the stored position. Small-infant support 35 extends into large-sized infant receptacle 16 to define a relatively smaller small-sized infant receptacle 14 therein in response to movement of small-infant support 35 to assume the infant-support position as suggested in FIGS. 2, 7, and 11.

Small-infant support 35 includes a first left side wing cushion 41 coupled to backrest 30 along a first left fold line 411 for movement about first left fold line 411 between a stored position outside of large-sized infant receptacle 16 and an infant-support position inside large-sized infant receptacle 116. Small-infant support 35 also includes a first right side wing cushion 43 coupled to backrest 36 along a first right fold line 433 for movement about first right fold line 433 between a stored position outside of large-sized infant receptacle 16 and an infant-support position inside large-sized infant receptacle 16. First left and right side wing cushions 41, 43 cooperate to define small-sized infant receptacle 14 therebetween in response to movement of first left and right side wing cushions 41, 42 to the infant-support positions.

Small-infant support 35 further includes a second left side wing cushion 42 coupled to backrest 36 along a second left fold line 422 for movement about second left fold line 422 between a stored position outside of large-sized infant receptacle 16 and an infant-support position inside large-sized infant receptacle 16. Small-infant support 35 also includes a second right side wing cushion 44 coupled to backrest 36 along a second right fold line 444 for movement about second right fold line 444 between a stored position outside of the large-sized infant receptacle. Second left and right side wing cushions 42, 44 cooperate to define small-sized infant receptacle 14 therebetween in response to movement of second left and right side wing cushions 42, 44 to the infant-support positions.

Backrest 36 is I-shaped and includes an upper center head mat 37 coupled to rim cushion 34 and formed to include first and second upper lobes 51, 52, a lower center body mat 38 arranged to lie in spaced-apart relation to upper center head mat 37 and formed to include first and second lower lobes 61, 62, and a neck 39 arranged to interconnect upper center head mat 37 and lower center body mat 38. Neck 39 and first upper and lower lobes 51, 61 cooperate to define a first belt-receiving notch 127. Neck 39 and second upper and lower lobes 52, 62 cooperate to define a second belt-receiving notch 126. First left side wing cushion 41 is coupled to first upper lobe 51 along first left fold line 411. Second left side wing cushion 42 is coupled to first lower lobe 62 along second left fold line 422. First right side wing cushion 43 is coupled to second upper lobe 52 along first right fold line 433. Second right side wing 44 is coupled to second lower lobe 62 along second right fold line 444.

Juvenile seat pad 12 further comprises inner anchor means 81, 83 on small-infant support 35 for retaining left and right cushion arms 71, 72 temporarily in stationary positions relative to backrest 36 at the option of a caregiver in the first positions relative to backrest 36 at the option of a caregiver in the first positions so that small-infant support 35 is retained in large-sized infant receptacle 16 when small-infant support 35 lies in the infant-support position. Inner anchor means 81, 83 includes a first left inner rim anchor 81 coupled to a front face of first left side wing cushion 41 and configured to be coupled to a first portion of left cushion arm 71 and a first right inner rim anchor 83 coupled to a front face of first right side wing cushion 43 and configured to be coupled to a first portion of right cushion arm 72.

Juvenile seat pad 12 further comprises outer anchor means 91, 93 on small-infant support 35 for retaining left and right cushion arms 71, 72 temporarily in stationary positions relative to backrest 36 at the option of a caregiver in the first positions so that small-infant support 35 is retained outside of large-sized infant receptacle 16 when small-infant support 35 lies in the stored position. Outer anchor means 91, 93 includes a first left outer rim anchor 91 coupled to a front face of first left side wing cushion 41 and configured to be coupled to a first portion of left cushion arm 71 and a first right outer rim anchor 93 coupled to a front face of first right side wing cushion 43 and configured to be coupled to a first portion of right cushion arm 72.

The invention claimed is:

1. A juvenile seat pad comprising
a mat providing a backrest and
variable-size infant receptacle means coupled to the mat for providing cushions that can be moved relative to the mat at the option of a caregiver to form, in a first configuration of the cushions, a small-sized infant receptacle suitable for a premature infant and, in a second configuration of the cushions, a relatively larger large-sized infant receptacle suitable for a relatively larger full-term infant so that a caregiver can reconfigure the juvenile seat pad in the field to provide either the small-sized infant receptacle or the large-sized infant receptacle
wherein the variable-size infant receptacle means includes at least two opposing foldable side wing cushions coupled to the mat and a long rim cushion coupled to the mat and formed to include left and right cushion arms that are free to be moved by a caregiver relative to the foldable side wing cushions and to the backrest to assume a first position on a front face of the mat to retain the at least two opposing foldable side wing cushions in an infant-support position overlying the backrest to define the small-sized infant receptacle therebetween and to assume a second position of the rim cushion attached to the mat on an opposite rear thee of the mat to retain the at least two foldable side wing cushions in a stored position lying away from the backrest to define the large-sized large infant receptacle therebetween.

2. A juvenile seat pad comprising
a seat back including a backrest and a first side wing cushion coupled to the backrest along a first fold line,
a seat bottom coupled to a lower portion of the seat back, and
a rim cushion attached to an upper portion of the seat back, the rim cushion including a first cushion arm mounted for movement among an initial position separated from the seat back, a first mated position mated temporarily with a front face of the seat back, and a second mated position mated temporarily with an opposite rear face of the seat back, wherein the first side wing cushion is movable relative to the backrest between an infant-support position arranged to overlie the backrest and a stored position arranged to lie away from the backrest.

3. The juvenile seat pad of claim 2, further comprising anchor means for retaining the first cushion arm temporarily on the seat back at the option of a caregiver in a selected one of the first mated position to retain the first side wing cushion in the infant-support position and the second mated position to retain the first side wing cushion in the stored position.

4. The juvenile seat pad of claim 3, wherein the anchor means includes a first inner rim anchor coupled to the front face of the seat back and configured to be coupled to a first portion of the first cushion arm and a first outer rim anchor coupled to the rear face of the seat back and configured to be coupled to a second portion of the first cushion arm.

5. The juvenile seat pad of claim 4, wherein the first side wing cushion is coupled to the backrest along a first fold line and each of the first inner and outer rim anchors are arranged to extend along the first fold line.

6. The juvenile seat pad of claim 4, wherein each of the first inner and outer rim anchors is a hook-and-loop fastener.

7. The juvenile seat pad of claim 4, wherein the first inner rim anchor is coupled to the first cushion arm to move therewith relative to the backrest.

8. The juvenile seat pad of claim 4, wherein the first outer rim anchor is coupled to the first cushion arm to move therewith relative to the backrest.

9. The juvenile seat pad of claim 2, wherein the rim cushion is an elongated cylinder-shaped member comprising the first cushion arm and a top cushion mount coupled to the backrest and to the first cushion arm to support the first cushion arm for movement relative to the seat back among the initial position and the first and second mated positions.

10. The juvenile seat pad of claim 9, wherein the rim cushion further comprises a second cushion arm coupled to the top cushion mount to cause the top cushion mount to interconnect the first and second cushion arms, the second cushion arm is mounted for movement among an initial position separated from the seat back, a first mated position mated temporarily with the front face of the seat back, and a second mated position mated temporarily with the opposite rear face of the seat back, and the first and second cushion arms cooperate to define a large-sized infant receptacle therebetween upon movement of each of the first and second cushion arms to assume respective first mated positions and movement of the first side wing cushion to the stored position.

11. The juvenile seat pad of claim 10, wherein the first side wing cushion is coupled to the backrest along a first fold line and the seat back further includes a second side wing cushion coupled to the backrest along a second fold line for movement relative to the backrest between an infant-support position arranged to overlie the backrest and a stored position arranged to lie away from the backrest and wherein the first and second side wing cushions are arranged to lie in the large-sized infant receptacle and cooperate to define a relatively smaller small-sized infant receptacle therebetween upon movement of the first and second cushion arms to assume the respective second mated positions and movement of the first and second side wing cushions to assume respective infant-support positions.

12. The juvenile seat pad of claim 2, wherein the first side wing cushion is coupled to the backrest along a first fold line, the seat back further includes a second side wing cushion coupled to the backrest along a second fold line, the rim cushion further includes a second cushion arm mounted for movement among an initial position separated from the seat back, a first mated position mated temporarily with the front face of the seat back, and a second mated position mated temporarily with an opposite rear face of the seat back, the second side wing cushion is movable relative to the backrest between an infant-support position arranged to overlie the front face of the backrest and a stored position arranged to lie away from the front face of the backrest to locate the second cushion arm between the second side wing cushion and the backrest, the first and second cushion arms cooperate to define a large-sized infant receptacle therebetween in response to movement of the first and second cushion arms to the first mated positions and movement of the first and second side wing cushions to the stored positions, and the first and second side wing cushions cooperate to define a relatively smaller small-sized infant receptacle therebetween in response to movement of the first and second cushion arms to the second mated positions and movement of the first and second side wing cushions to the infant-support positions.

13. The juvenile seat pad of claim 12, wherein the backrest includes an upper center head mat coupled to the rim cushion, a lower center body mat coupled to the seat bottom, and a neck arranged to interconnect the head and body mats, the first side wing cushion is coupled to the upper center head mat along the first fold line, and the second side wing cushion is coupled to the upper center head mat along the second fold line.

14. The juvenile seat pad of claim 13, wherein the rim cushion further includes a top cushion mount arranged to interconnect the first and second cushion arms and coupled to a portion of the upper center head mat located between the first and second fold lines.

15. The juvenile seat pad of claim 13, further comprising first anchor means on the first side wing cushion for retaining the first cushion arm temporarily in a stationary position relative to the upper center head mat at the option of a caregiver in a selected one of the first mated position to retain the first side wing cushion in the infant-support position and the second mated position to retain the first side wing cushion in the stored position and second anchor means on the second side wing cushion for retaining the second cushion arm temporarily in a stationary position relative to the upper center head mat at the option of a caregiver in a selected one of the first mated position to retain the second side wing cushion in the infant-support position and the second mated position to retain the second side wing cushion in the stored position.

16. The juvenile seat pad of claim 13, further comprising first anchor means on the first side wing cushion for retaining the first cushion arm temporarily on the in a stationary position relative to the lower center body mat at the option of a caregiver in a selected one of the first mated position to retain the first side wing cushion in the infant-support position and the second mated position to retain the first side wing cushion in the stored position and for retaining the second cushion arm temporarily in a stationary position relative to the lower center body mat at the option of a caregiver in a selected one of the first mated position to retain the second side wing cushion in the infant-support position and the second mated position to retain the second side wing cushion in the stored position.

17. A juvenile seat pad comprising
a backrest having a left-side portion and a right-side portion,
a small-infant support mounted for movement relative to the backrest between a stored position lying away from the backrest and an infant-support position contacting the backrest, and
a rim cushion attached to the backrest, the rim cushion including a left cushion arm mounted for movement relative to the backrest between a first position alongside and in contact with a front face of the left-side portion of the backrest and a second position away from the front face of the left-side portion of the backrest and in contact with a rear face of the backrest, the rim cushion also including a right cushion arm mounted for movement relative to the backrest between a first position alongside and in contact with a front face of the right-side portion of the backrest and a second position away from the front face of the right-side portion of the backrest and in contact with the rear face of the backrest and wherein the left and right cushion arms cooperate to define a large-sized infant receptacle located therebetween in response to movement of the left and right cushion arms to the first positions while the small-infant support is located in the stored position and wherein the small-infant support extends into the large-sized infant receptacle to define a relatively smaller small-sized infant receptacle therein in response to movement of the small-infant support to assume the infant-support position.

18. The juvenile seat pad of claim 17, wherein the small-infant support includes a first left side wing cushion coupled to the backrest along a first left fold line for movement about the first left fold line between a stored position outside of the large-sized infant receptacle and an infant-support position inside the large-sized infant receptacle and a first right side wing cushion coupled to the backrest along a first right fold line for movement about the second first right fold line between a stored position outside of the large-sized infant receptacle and an infant-support position inside the large-sized infant receptacle and the first left and right side wing cushions cooperate to define the small-sized infant receptacle therebetween in response to movement of the first left and right side wing cushions to the infant-support positions.

19. The juvenile seat pad of claim 18, wherein the small-infant support further includes a second left side wing cushion coupled to the backrest along a second left fold line for movement about the second left fold line between a stored position outside of the large-sized infant receptacle and an infant-support position inside the large-sized infant receptacle and a second right side wing cushion coupled to the backrest along a second right fold line for movement about the second right fold line between a stored position outside of the large-sized infant receptacle and an infant-support position inside the large-sized infant receptacle and the second left and right side wing cushions cooperate to define the small-sized infant receptacle therebetween in response to movement of the second left and right side wing cushions to the infant-support positions.

20. The juvenile seat pad of claim 19, wherein the backrest is I-shaped and includes an upper center head mat coupled to the rim cushion and formed to include first and second upper lobes, a lower center body mat arranged to lie in spaced-apart relation to the upper center head mat and formed to include first and second lower lobes, and a neck arranged to interconnect the upper center head mat and the lower center body mat, the neck and the first upper and lower lobes cooperate to define a first belt-receiving notch, the neck and the second upper and lower lobes cooperate to define a second belt-receiving notch, the first left side wing cushion is coupled to the first upper lobe along the first left fold line, the second left side wing cushion is coupled to the first lower lobe along the second left fold line, the first right side wing cushion is coupled to the second upper lobe along the first right fold line, and the second right side wing is coupled to the second lower lobe along the second right fold line.

21. The juvenile seat pad of claim 17, further comprising inner anchor means on the small-infant support for retaining the left and right cushion arms temporarily in stationary positions relative to the backrest at the option of a caregiver in the first positions so that the small-infant support is retained in the large-sized infant receptacle when the small-infant support lies in the infant-support position.

22. The juvenile seat pad of claim 21, wherein the small-infant support includes a first left side wing cushion coupled to the backrest along a first left fold line for movement about the first left fold line between a stored position outside of the large-sized infant receptacle and an infant-support position inside the large-sized infant receptacle and a first right side wing cushion coupled to the backrest along a first right fold line for movement about the second first right fold line between a stored position outside of the large-sized infant receptacle and an infant-support position inside the large-sized infant receptacle and the first left and right side wing cushions cooperate to define the small-sized infant receptacle therebetween in response to movement of the first left and right side wing cushions to the infant-support positions and the inner anchor means includes a first left inner rim anchor coupled to a front face of the first left side wing cushion and configured to be coupled to a first portion of the left cushion arm and a first right inner rim anchor coupled to a front face of the first right side wing cushion and configured to be coupled to a first portion of the right cushion arm.

23. The juvenile seat pad of claim 17, further comprising outer anchor means on the small-infant support for retaining the left and right cushion arms temporarily in stationary positions relative to the backrest at the option of a caregiver in the first positions so that the small-infant support is retained outside of the large-sized infant receptacle when the small-infant support lies in the stored position.

24. The juvenile seat pad of claim 23, wherein the small-infant support includes a first left side wing cushion coupled to the backrest along a first left fold line for movement about the first left fold line between a stored position outside of the large-sized infant receptacle and an infant-support position inside the large-sized infant receptacle and a first right side wing cushion coupled to the backrest along a first right fold line for movement about the second first right fold line between a stored position outside of the large-sized infant receptacle and an infant-support position inside the large-sized infant receptacle and the first left and right side wing cushions cooperate to define the small-sized infant receptacle therebetween in response to movement of the first left and right side wing cushions to the infant-support positions and wherein the small-infant support includes a first left side wing cushion coupled to the backrest along a first left fold line for movement about the first left fold line between a stored position outside of the large-sized infant receptacle and an infant-support position inside the large-sized infant receptacle and a first right side wing cushion coupled to the backrest along a first right fold line for movement about the second first right fold line between a stored position outside of the large-sized infant receptacle and an infant-support position inside the large-sized infant receptacle and the first left and right side wing cushions cooperate to define the small-sized infant receptacle therebetween in response to movement of the first left and right side wing cushions to the infant-support positions and the outer anchor means includes a first left outer rim anchor coupled to a front face of the first left side wing cushion and configured to be coupled to a first portion of the left cushion arm and a first right outer rim anchor coupled to a front face of the first right side wing cushion and configured to be coupled to a first portion of the right cushion arm.

* * * * *